United States Patent [19]

Ochiai et al.

[11] 3,828,147

[45] Aug. 6, 1974

[54] ECHO CANCELLER ARRANGEMENT COMPRISING QUASI-STATIC ECHO CANCELLERS AND A SMALLER NUMBER OF SELF-ADAPTIVE ECHO CANCELLERS

[75] Inventors: Kazuo Ochiai; Takashi Araseki; Yasuo Kato, all of Tokyo, Japan

[73] Assignee: Nippon Electric Company, Limited, Tokyo, Japan

[22] Filed: Feb. 20, 1973

[21] Appl. No.: 333,469

Related U.S. Application Data

[63] Continuation-in-part of Ser. No. 279,468, Aug. 10, 1972, abandoned.

[30] Foreign Application Priority Data

Feb. 18, 1972 Japan.............................. 47-16500

[52] U.S. Cl. .......................................... 179/170.2

[51] Int. Cl. .......................................... H04b 3/20

[58] Field of Search..................... 179/170.2, 170.6

[56] References Cited

UNITED STATES PATENTS 3,647,992 3/1972 Thomas ......................... 179/170.2

3,754,105 8/1973 Poschenrieder et al. ........ 179/170.2

*Primary Examiner*—Kathleen H. Claffy

*Assistant Examiner*—Mitchell Saffian

*Attorney, Agent, or Firm*—Ostrolenk, Faber, Gerb & Soffen

[57] ABSTRACT

An echo canceller arrangement for a plurality of channels comprises an equal plurality of quasi-static echo cancellers for the respective channels and a smaller number of self-adaptive echo cancellers which are coupled with a group of quasi-static echo cancellers for an equal smaller number of selected channels. Channel selection is successively varied in such a manner that various groups of all quasi-static echo cancellers are successively coupled with the self-adaptive echo cancellers. One of the echo path models retained by each self-adaptive echo canceller and by the quasi-static echo canceller coupled with the last-mentioned self-adaptive echo canceller is rewritten with reference to the other when the above-mentioned other model gives a significantly worse approximation of the characteristics of the concerned actual echo path than the above-mentioned one model.

7 Claims, 8 Drawing Figures

ECHO CANCELLER ARRANGEMENT COMPRISING QUASI-STATIC ECHO CANCELLERS AND A SMALLER NUMBER OF SELF-ADAPTIVE ECHO CANCELLERS

CROSS-REFERENCE TO A RELATED APPLICATION

This is a continuation-in-part application of our copending U.S. Pat. application Ser. No. 279,468 filed Aug. 10, 1972, now abandoned.

BACKGROUND OF THE INVENTION

This invention relates to an echo canceller arrangement for a plurality of channels.

An echo canceller is used in the adjacency of a junction between a four-wire circuit and a two-wire circuit in a long-distance communication network to remove the undesirable echo signal produced by the unavoidable mismatch of a hybrid coil serving as the junction and inevitably providing in practice an actual echo path. The echo canceller is provided with a model of the actual echo path for producing an approximate echo signal in response to the signal in the four-wire receive line and superposes the approximate echo signal on the two-wire send-in signal to make the signal in the four-wire send line substantially free from the undesirable actual echo signal. Consequently, a preferred echo canceller of the type generally called a self-adaptive echo canceller has, as its principal constituents, an approximate echo signal producing unit responsive to an echo path model retained thereby and to the signal in the four-wire receive line for producing an approximate echo signal and a model modifying signal producing unit responsive to the four-wire receive line and the send line signals for producing a model modifying signal for modifying the echo path model so as to make the approximate echo signal producing unit produce a better approximation of the echo signal.

Typically, an office services a plurality of channels, for which a like plurality of echo cancellers are necessary, respectively. Conveniently, an echo canceller arrangement comprising such a plurality of echo cancellers may comprise a multitude (for example, a number equal to the number of the entire channels) of approximate echo signal producing units, each retaining an echo path model, and a smaller number of model modifying signal producing units. This is based on the fact that it is unnecessary to modify the echo path model all the time. It is, however, required with this arrangement that the echo path models are rapidly modified because the modification is intermittently carried out with intermissions. Furthermore, means is required for instantaneously judging, on initiation of the modification, whether the double talk is present or not and for stopping the modification if the double talk is present. The problem is that there two requisites are contradictory because rapid modification results in meager capability of detection of the double talk while the high ability of the double talk detection results in reduction in the speed of modification.

SUMMARY OF THE INVENTION:

It is therefore an object of the present invention to provide an inexpensive and yet effective echo canceller arrangement.

It is another object of this invention to provide an echo canceller arrangement for a plurality of channels comprising an equal plurality of quasi-static echo cancellers and a very small number of self-adaptive echo cancellers.

It is still another object of this invention to provide an echo canceller arrangement capable of rapidly adapting itself to the characteristics of the actual echo paths and yet sensitively judging whether the double talk is present or not.

It is yet another object of this invention to provide an echo canceller arrangement whose echo path models are little adversely affected by the double talks so that the models are rapidly self-adaptive to the variation in the characteristics of the actual echo paths.

According to this invention, an echo canceller arrangement for a preselected number of channels comprises a self-adaptive echo canceller and a plurality of quasi-static echo cancellers operatively associated with the respective channels. Inasmuch as the subject matter of this invention is an echo canceller arrangement, it should be understood that each channel has an echo path. As is known in the art, each of the quasi-static echo cancellers retains a first echo path model giving an approximation of the characteristics of the echo path of the associated channel. The arrangement further comprises first means for selecting one of the channels and for operatively coupling the self-adaptive echo canceller with the quasi-static echo canceller associated with the selected channel. In accordance with this invention, the self-adaptive echo canceller stores a second echo path model giving an approximation of the characteristics of the echo path of the selected channel and comprises means for self-adaptively improving the approximation given by the second echo path model with reference to the last-mentioned characteristics. The arrangement still further comprises second means for comparing the approximations given by the echo path models retained by the self-adaptive echo canceller and by the quasi-static echo canceller associated with the selected channel and for storing one of the last-mentioned echo path models with reference to the other when the said one of the echo path models gives a significantly worse approximation of the concerned echo path than the said other.

Figure 1:
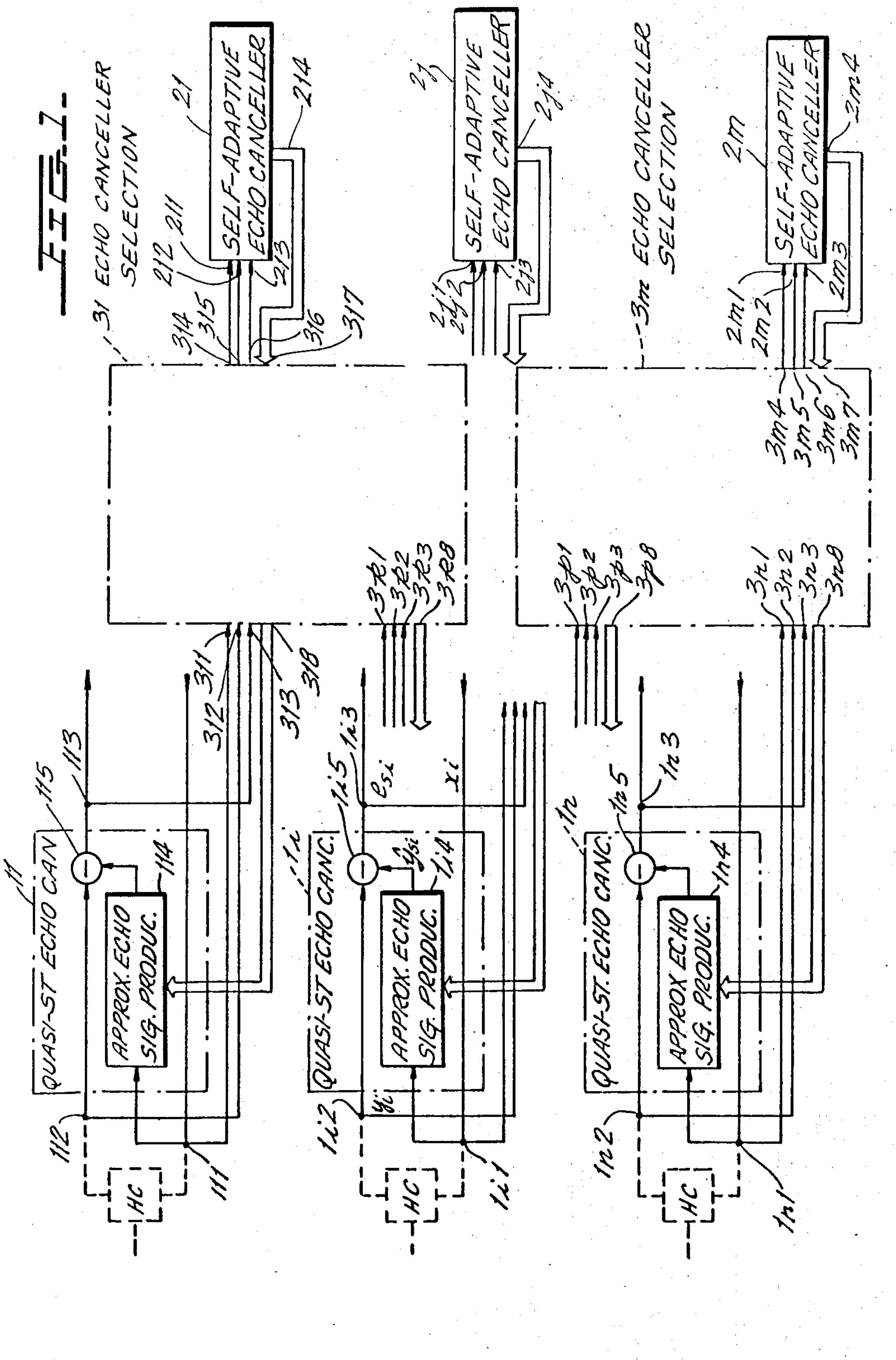
FIG. 1 is a block diagram of a first embodiment of the instant invention.

DESCRIPTION OF THE PREFERRED EMBODIMENTS:

Referring to FIG. 1, a simplest possible embodiment of the present invention is illustrated with a view to affording a clear understanding of this invention. This first embodiment comprises a plurality of quasi-static echo cancellers 1*l*, . . . ,1*i*, . . . , and 1*n*, *n* in number. The echo cancellers comprise receive-in terminals 1*l*1, . . . , 1*i*1, . . . , and 1*n*1 disposed in those receive branches or lines of the respective four-wire lines which are led from remote offices (not shown), send-in terminals 1*l*2, . . . , 1*i*2, . . . , and 1*n*2 located in those other (send) branches of the respective four-wire circuits with which the receive-in branches are coupled together with the two-wire lines through the hybrid coils depicted with broken lines, and send-out terminals 1*l*3, . . . , 1*i*3, . . . , and 1*n*3 placed in the above-mentioned other (send) branches leading to the remote offices. The echo cancellers further comprise approximate echo signal producing units 1*l*4, . . . , 1*i*4, . . . , and 1*n*4 retaining quasi-static echo path models and responsive to receive-in signals $x_i$ ($i = 1, 2, \ldots, n$) for producing approximate echo signals $\hat{y}_{si}$ approximating the respective actual echo signals inevitably produced at the send-in terminals from receive-in signals $x_i$ by the actual echo paths including the hybrid coils. For purposes of simplicity the four-wire circuit shall hereinafter be understood to comprise a receive line and a send line while a two-wire circuit is understood to comprise a single two-wire line used for both sending and receiving. The electrical connection between the four-wire circuit and the two-wire circuit is established by a hybrid circuit (HC-FIG. 1). The quasi-static receive-in terminal 1*i*1 is defined as the input terminal of the canceller 1*i* (FIG. 1) which receives the signal appearing in the four-wire circuit receive-line; the send-in terminal 1*i*2 is defined as the input terminal of the canceller 1*i* which receives the signal applied to the four-wire circuit send line by the hybrid circuit HC and before echo cancellation occurs; and the send-out terminal is the output terminal of the canceller 1*i* which applies either a residual echo signal to the four-wire circuit send line (in the case where the two-wire line is not sending) or a voice signal substantially free of double talk (in the case where the two-wire line is sending). The echo cancellers still further comprise combining circuits 1*l*5, . . . , 1*i*5, . . . , and 1*n*5 for superposing the respective approximate echo signals on the send-in signals with appropriate polarity to derive send-out signals $e_{si}$ which in the absence of the double talks are residual echo signals. In practice, each residual echo signal contains a small amount of the residual echo. Each of the approximate echo signal producing units 1*l*4, . . . , 1*i*4, . . . , and 1*n*4 may be of any of the conventional constructions, such as described in a copending U.S. Pat. application Ser. No. 254,071 filed May 17, 1972, now U.S. Pat. No. 3,787,645 issued Jan. 22, 1974. The number *n* is equal to the number of channels accommodated by the office shown. The first embodiment further comprises a plurality of self-adaptive echo cancellers 21, . . . , 2*j*, . . . , and 2*m*, *m* in number. These latter echo cancellers comprise first input terminals 2*l*1, . . . , 2*j*1, . . . , and 2*m*1, second input terminal 2*l*2, . . . , 2*j*2, . . . , and 2*m*2, third input terminals 2*l*3, . . . , 2*j*3, . . . , and 2*m*3, and output terminals 2*l*4, . . . , 2*j*4, . . . , and 2*m*4. The first embodiment still further comprises a plurality of echo canceller selection units 31, . . . , and 3*m*, each being interposed between a self-adaptive echo canceller 21, . . . , or 2*m* and a small number, *k*, of the quasi-static echo cancellers. Thus, the numbers *m* and *k* may, for example, be related to the number *n* by an equality $mk = n$. More particularly, the first selection unit 31 has first input terminals 3*l*1, . . . , and 3*k*1 connected with the receive-in terminals 1*l*1 through 1*k*1 (not shown) of the first through the k-th quasi-static echo cancellers 1*l* through 1*k* (not shown), second input terminals 3*l*2, . . . , and 3*k*2 connected with the send-in terminals 1*l*2 through 1*k*2 (not shown), third input terminals 3*l*3, . . . , and 3*k*3 connected with the send-out terminals 1*l*3 through 1*k*3 (not shown), a first, a second, and a third output terminals 3*l*4, 3*l*5, and 3*l*6 connected with the first through the third input terminals 2*l*1 through 2*l*3 of the first self-adaptive echo canceller 2*l*, a fourth input terminal 3*l*7 connected with the output terminal 2*l*4, a fourth output terminals 3*l*8, . . . , and 3*k*8 leading to the approximate echo signals producing units 1*l*4 through 1*k*4 (not shown). Other selection units have similar input and output terminals, such as 3*p*1 through 3*n*1, 3*p*2 through 3*n*2, 3*p*3 through 3*n*3, 3*m*4, 3*m*5, 3*m*6, 3*m*7, and 3*p*8 through 3*n*8 illustrated with respect to the m-th selection unit 3*m*, the letter *p* representing a number equal to or greater than $n - k + l$. Each of the selection units 3*l* through 3*m* comprises means for cyclically or otherwise selectively connecting the first through the third input terminals and the fourth output terminals, such as 3*l*1, 3*l*2, 3*l*3, and 3*l*8 through 3*k*1, and 3*k*2, 3*k*3, and 3*k*8, with the first through the third output terminals and the fourth input terminal, such as 3*l*4, 3*l*5, 3*l*6, and 3*l*7, in a time division fashion. It will readily be understood that a set of connections are established, for example, between the i-th quasi-static echo canceller 1*i* and the j-th self-adaptive echo canceller 2*j*. In this event, the first through the third input terminals 2*j*1, 2*j*2, and 2*j*3 of the j-th self-adaptive echo canceller 2*j* are supplied with the receive-in signal $x_i$, the send-in signal $y_i$, and the send-out signal $e_{si}$ of the i-th channel, respectively. The output terminal 2*j*4 is connected with the approximate echo signal producing unit 1*i*4 of the i-th quasi-static echo canceller 1*i*. Such connections are preferably established during absence of the double talk in the particular channel with which the j-th self-adaptive echo canceller 2*j* is to be associated. It is possible to judge the presence and the absence of the speech signal sent from the local subscriber of the particular channel by means of a conventional speech signal detector coupled with the channel. More particularly, each of the selection units 3*l* through 3*m* may comprise a plurality of speech signal detectors coupled with the respective channels served by the selection unit and electronic switch means for cyclically establishing the connections while the speech signals are not detected (i.e., are not present) in the channel concerned. Alternatively, each selection unit may comprise a single speech signal detector, first electronic switch means for cyclically associating the channels served by the selection unit with the detector, and second electronic switch means for establishing the connection between the accompanying self-adaptive echo canceller and the channel presently coupled with the detector if absence of the speech signal is confirmed by the detector.

Figure 2:
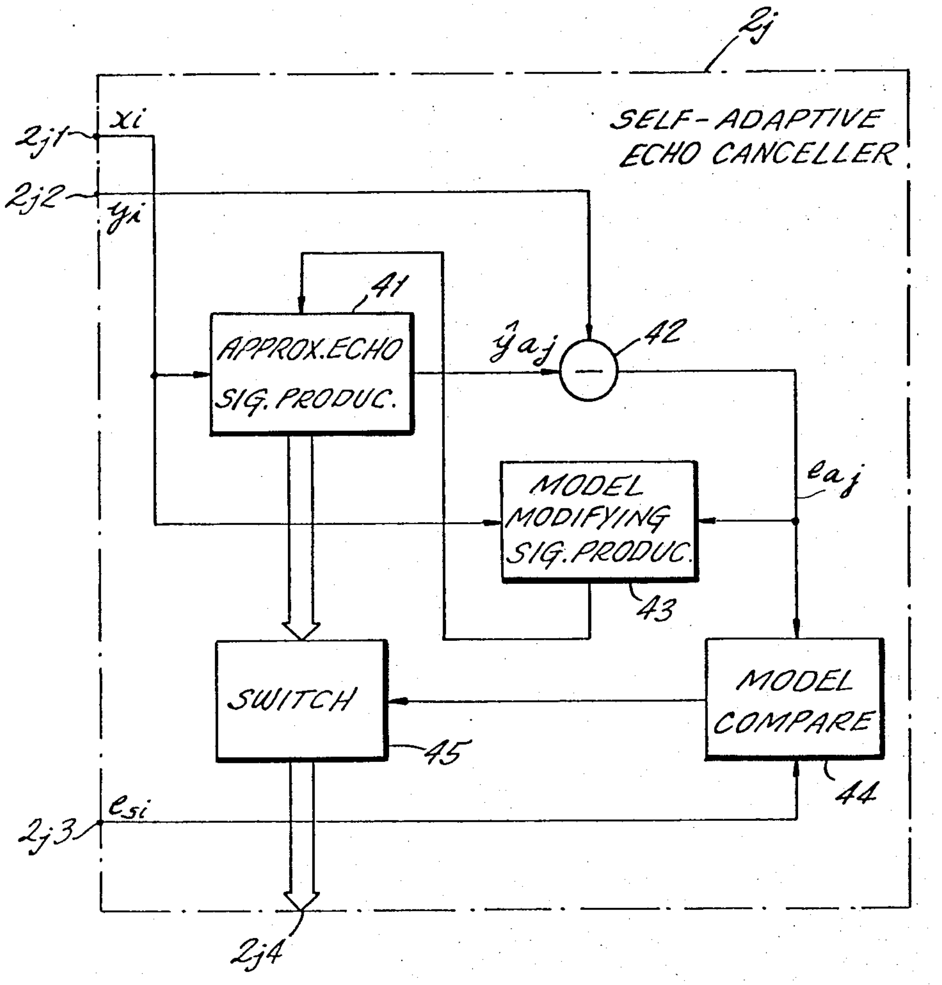
FIG. 2 shows a block diagram of a self-adaptive echo canceller used in plurality of this invention, together with a block diagram of means for rewriting the echo path model retained by a quasi-static echo canceller used also in plurality in this invention with reference to the echo path model retained by the illustrated self-adaptive echo canceller.

Referring to FIG. 2, the j-th self-adaptive echo canceller 2j is depicted as an example of such echo cancellers 2l through 2m. For the convenience of illustration, the echo canceller 2j is depicted in FIG. 2 together with means for transferring the contents thereof to that one of the quasi-static echo cancellers 1l through 1k which is operatively coupled through by the accompanying echo canceller selection unit 3j (not shown). Also, it is assumed that the echo canceller 2j is connected with the i-th channel and consequently with the i-th quasi-static echo canceller 1i. The self-adaptive echo canceller 2j comprises an approximate echo signal producing unit 4l responsive to the echo path model retained therein in the manner described later and to the receive-in signal $x_i$ supplied to the first input terminal 2j1 through the accompanying selection unit 3j for producing an approximate echo signal $\hat{y}_{aj}$ approximating the actual echo signal of the actual echo path of the i-th channel. The echo canceller 2j further comprises a combining circuit 42 for combining the approximate echo signal $\hat{y}_{aj}$ with the send-in signal $y_i$ applied to the second input terminal 2j2 by the selection unit 3j to produce a residual echo signal $e_{aj}$ and an adaptive control unit, or a model modifying signal producing unit, 43 responsive to the receive-in signal $x_i$ and the residual echo signal $e_{aj}$ for producing a model modifying signal for modifying the above-mentioned echo path model. The quasi-static echo path model rewriting means comprises an echo path model comparing circuit 44 for comparing the residual echo signal $e_{aj}$ derived by the combining circuit 42 with the send-out signal $e_{si}$ applied to the third input terminal 2j3 by the selection unit 3j for a predetermined short interval of time to produce a command signal when the short time average of the residual echo signal $e_{aj}$ is smaller than the like average of the send-out signal $e_{si}$. The presence and the absence of the command signal thus respectively indicates that the self-adaptive echo path model gives a better and a worse approximation of the characteristics of the actual echo path of the i-th channel currently served by the self-adaptive echo canceller 2j than the quasi-static echo path model retained by the quasi-static echo canceller 2i coupled with the self-adaptive echo canceller 2j through the selection unit 3j. The model rewriting means further comprises a switch circuit 45 responsive to the command signal for transferring the contents of the approximate echo signal producing unit 41 via the output terminal 2j4 to the quasi-static echo canceller 2i coupled with this self-adaptive echo canceller 2j through the selection unit 3j. The quasi-static echo path models are not self-adaptive but give the best possible approximations of the characteristics of the actual echo paths of the associated channels in the manner mentioned above.

A pair of the self-adaptive echo canceller and one of the quasi-static echo cancellers coupled therewith thus forms an echo canceller composition having two echo path models disclosed in the above-referenced copending patent application. The specification and the accompanying drawings of the copending application should therefore be deemed as a part of the specification and drawings of the instant application. The salient features of such a pair reside in the fact that the acting echo path model is little disturbed by the double talk and accordingly has rapid adaptability to the variation in the characteristics of the actual echo path. The present invention makes use of the rapid adaptability of the echo path model and the appreciably excellent capability of the local speech detection afforded by the conventional speech detectors. Furthermore, the present invention makes use of the fact that the ordinary talk contains a considerable amount of the pause intervals during which no words are spoken. The number *m* of the self-adaptive echo cancellers 2l through 2m mentioned above is determined with reference to the duration of such pauses and to the rate of possible variation of the characteristics of each actual echo path.

Figure 3:
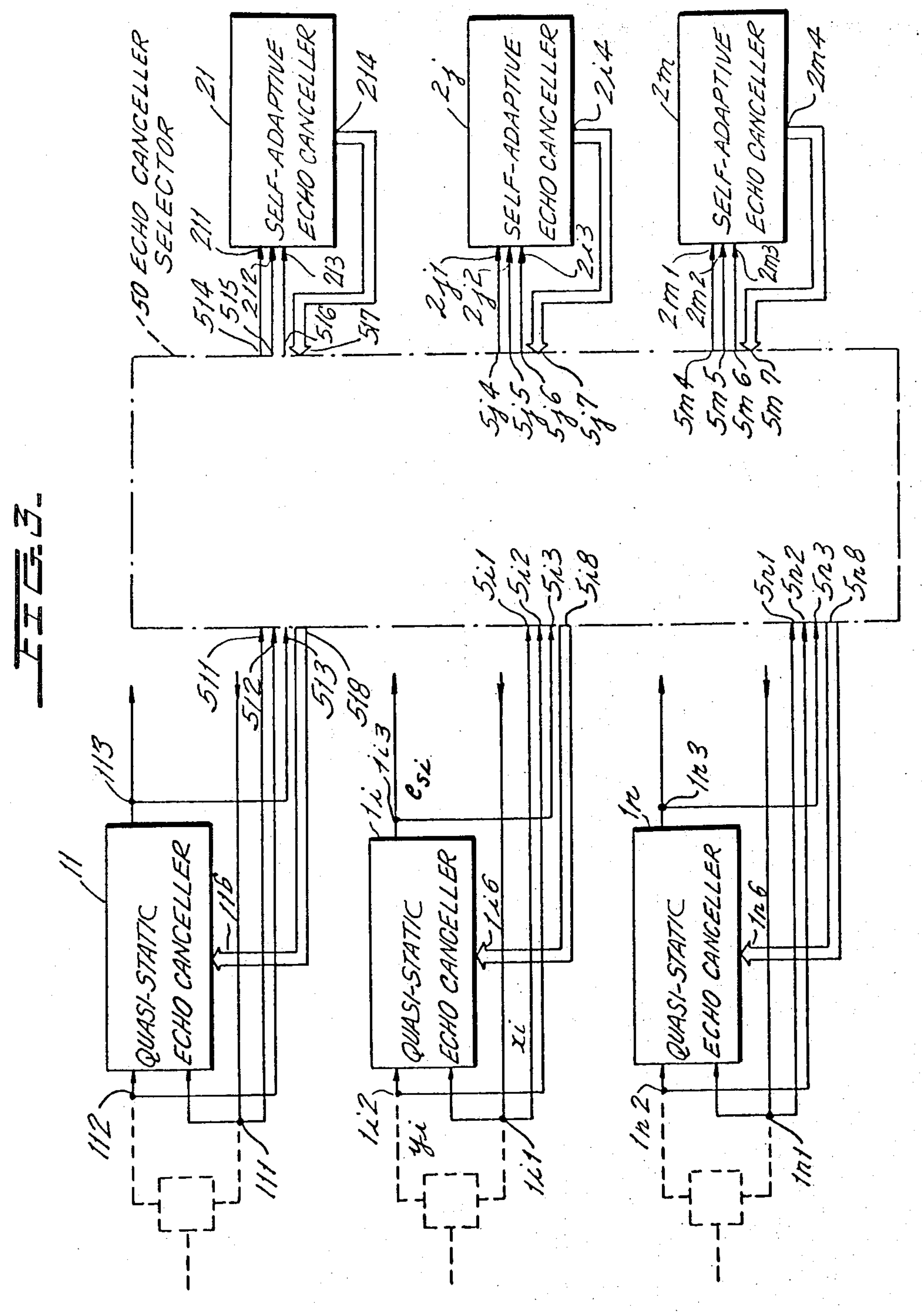
FIG. 3 is a block diagram of a second embodiment of the present invention.

Referring to FIG. 3, a more generalized embodiment of the instant invention includes a plurality of quasi-static echo cancellers 1l, . . . , 1i, . . . , and 2n, *n* in number, which are the equivalents of the quasi-static echo cancellers illustrated with reference to FIG. 1 and have receive-in terminals 1l1, . . . , 1i1, . . . , and 1n1, send-in terminals 1l2, . . . , 1i2, . . . , and 1n2, and send-out terminals 1l3, 1i3, . . . , and 1n3 corresponding to the equivalent terminals shown in FIG. 1 as well as echo path model transfer terminals 1l6, . . . , 1i6, . . . , and 1n6 which are not specifically illustrated in FIG. 1. The second embodiment further comprises a smaller number of self-adaptive echo cancellers 2l, . . . , 2j, . . . , and 2m, *m* in number, which are the counterparts of the self-adaptive echo cancellers shown in FIG. 1 and have first input terminals 2l1 , . . . , 2j1, . . . , and 2m1, second input terminals 2l2, . . . 2j2, . . . , and 2m2, third input terminals 2l3, . . . , 2j3, . . . , and 2m3, an echo path model output terminals 2l4, . . . , 2j4, . . . , and 2m4 which are the counterparts of the corresponding terminals depicted in FIG. 1. The second embodiment still further comprises a single echo canceller selection unit 50 having first input terminals 5l1, . . . , 5i1, . . . , and 5n1 connected with the receive-in terminal 1l1 through 1n1, second input terminals 5l2, . . . , 5i2, . . . , and 5n2 connected with the send-in terminals 1l2 through 1n2, third input terminals 5l3, . . . , 5i3, . . . , and 5n3 connected with the send-out terminals 1l3 through 1 n3, first output terminals 5l4, . . . , 5j4, . . . , and 5m4 connected with the first input terminals 2l1 through 2m1 of the self-adaptive echo cancellers 2l through 2m, second output terminals 5l5, . . . , 5j5, . . . , and 5m5 connected with the corresponding second input terminal 2l2 through 2m2, third output terminals 5l3, . . . , 5j3, . . . , and 5m3 connected with the corresponding third input terminals 2l3 through 2m3, fourth input terminals 5l7, . . . , 5j7, . . . , and 5m7 connected with the self-adaptive echo canceller output terminals 2l4 through 2m4, and fourth output terminals 5l8, . . . 5i8, . . . , and 5n8 connected with the echo path model transfer terminals 1l6 through 1n6. As do the selection units 3l through 3m of the first embodiment, the single selection unit 50 comprises means for selecting those *m* terminals sets out of the first through the third input terminals 5l1, 5l2, and 5l3 through 5n1, 5n2, and 5n3 together with the associated ones of the fourth output terminals 5l8 through 5n8 which are coupled with the channels having speech signals, means for establishing the connections between the selected terminals and the first through the third output and the fourth input terminals 5l4, 5l5, 5l6, and 5l7 through 5m4, 5m5, 5m7 thereby operatively coupling the self-adaptive echo concellers 21 through 2m with the selected quasi-static echo cancellers, and means for varying the selection of the quasi-static echo cancellers in such a manner that all the quasi-static echo cancellers 1*l* through 1*n* may be connected with the self-adaptive echo concellers 2*l* through 2*m* in a time division fashion. Here too, it should be understood that each of the self-adaptive echo cancellers 2*l* through 2*m* accompanies in the manner illustrated in FIG. 2 the means responsive to the self-adaptive echo path model and the quasi-static echo path model retained by that one of the quasi-static echo cancellers 1*l* through 1*n* which is coupled with the self-adaptive echo canceller for rewriting the quasi-static echo path model with reference to the self-adaptive echo path model when the latter gives a significantly better approximation of the concerned actual echo path than the former. With this embodiment, it is possible to use the self-adaptive echo cancellers 21 through 2*m* in optional connection with the quasi-static echo cancellers 1*l* through 1*n* so that the former may more effectively be utilized with the number of the former reduced accordingly.

Figure 5:
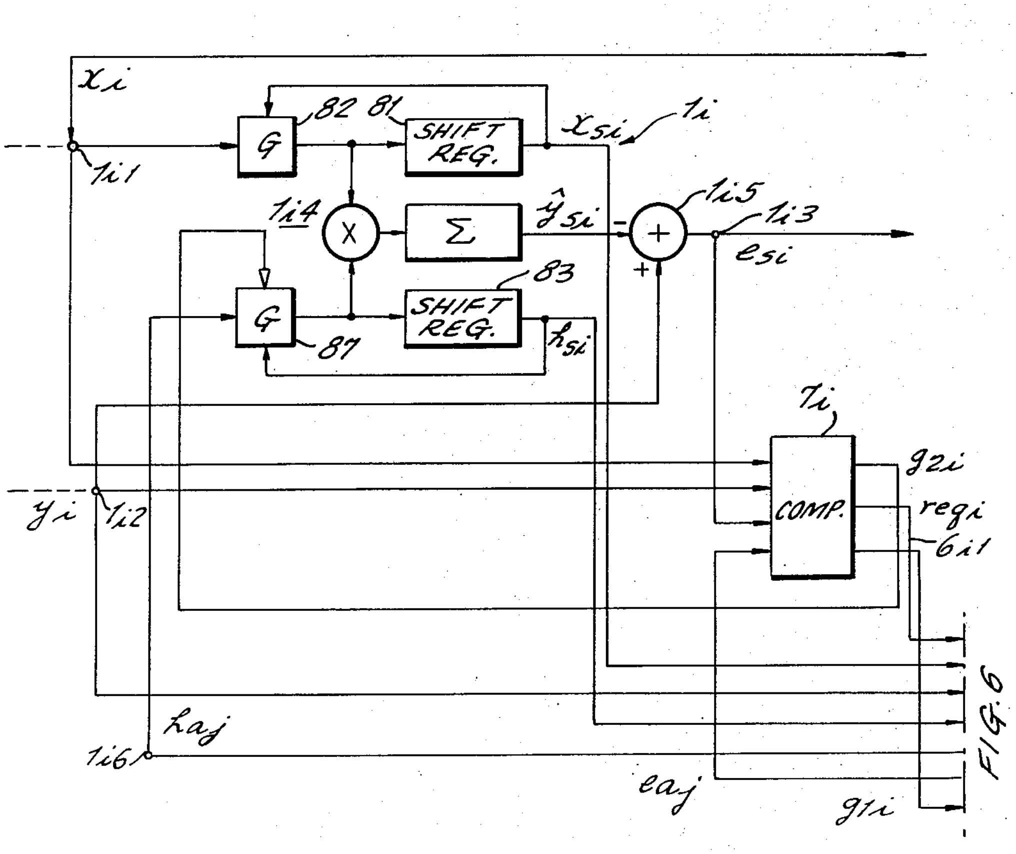
FIG. 5 is a block diagram of a quasi-static echo canceller and an accompanying circuit used in the third embodiment of this invention.

In connection with the embodiments thus far described, it is to be noted that each of the self-adaptive echo cancellers 2*l* through 2*m*, at the instant of establishment of a connection with one of the quasi-static echo cancellers 1*l* through 1*n*, may retain an appreciably different self-adaptive echo path model as compared with the characteristics of the actual echo path of the newly selected channel because the self-adaptive echo path model has been giving an approximation of the characteristics of the actual echo path of the channel that has been coupled with the self-adaptive echo canceller until establishment of the new connection. This reduces the speed of adaptation of the self-adaptive echo path model to the new actual echo path. It is therefore more preferable to rewrite the self-adaptive echo path model with reference to the quasi-static echo path model retained by the coupled quasi-static echo canceller as soon as the new connection is established, because the quasi-static echo path model generally gives a better approximation of the newly selected actual echo path at the instant of establishment of the new connection. This is achieved by simple and non-logic means which is enabled for only a short duration immediately following the completion of the new connection. This speeds up the adaptability of the echo canceller arrangement according to this invention to the actual echo paths and further reduces the number of the self-adaptive echo cancellers 2*l* through 2*m* accompanying the echo path model transferring means. Incidentally, the non-logic means is represented in FIG. 5 of the referenced application by a switch 82. It is to be noted that the first and the second echo cancellers of the reference application correspond to the second and the first echo cancellers of the instant invention, respectively.

Figure 4:
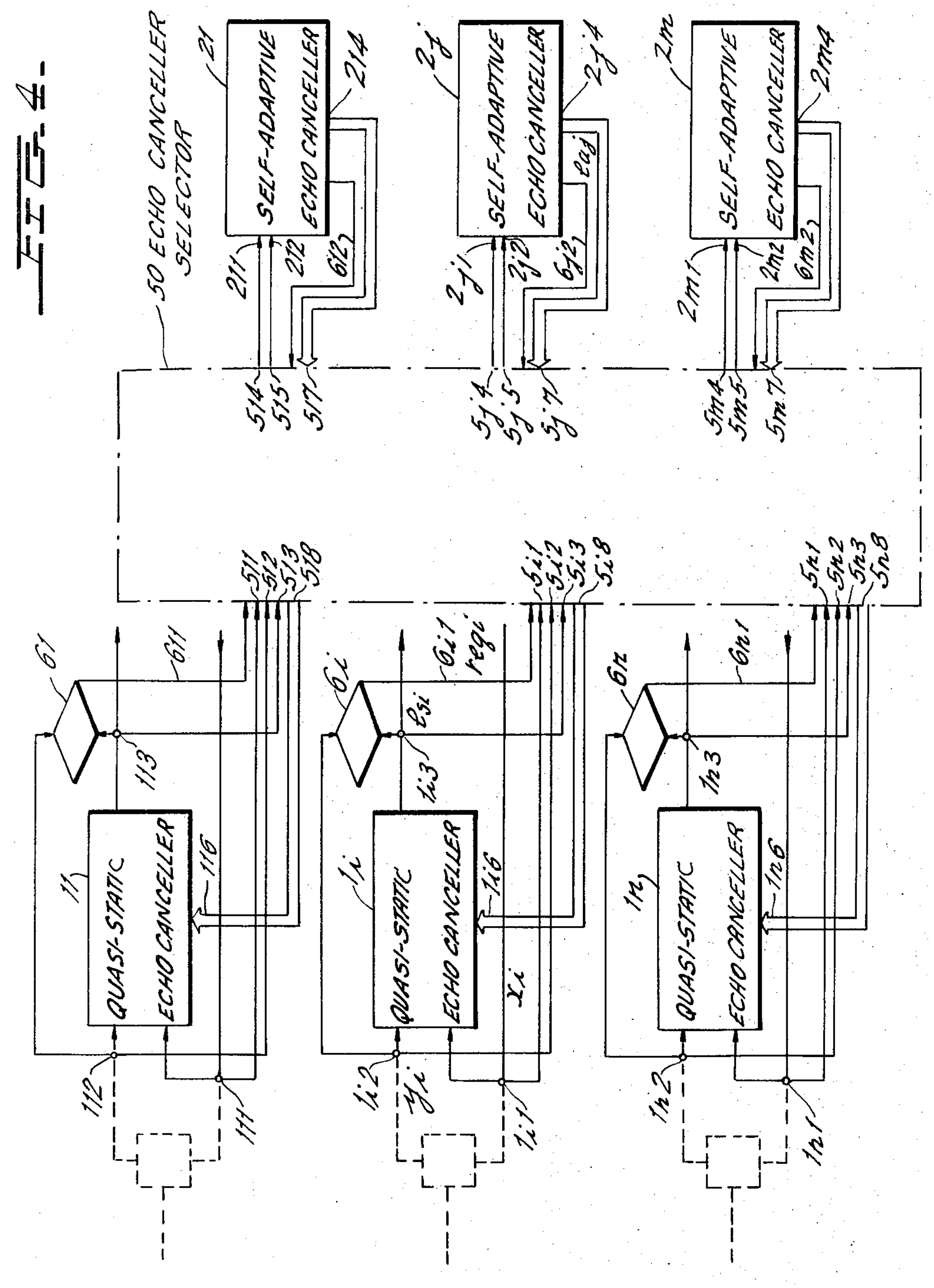
FIG. 4 is a block diagram of a third embodiment of this invention.

Referring now to FIG. 4, a third embodiment of the present invention comprises circuit elements similar to those illustrated with reference to FIGS. 1 and 3 and designated with like reference numerals. The third embodiment further comprises a monitor 6*i* ($i = 1, 2, \ldots, n$) interposed between the send-in terminal 1*i*2 of each channel and the send-out terminal 1*i*3 of the channel for monitoring the ratio (herein called the ERLE) of the level of the send-in signal $y_i$ to the level of the residual echo signal $e_{si}$. When the ERLE is less than a preselected threshold ratio, the monitor 6*i* delivers a modification request signal $req_i$ to the echo canceller selection unit 50 through a control connection 6*i*1, judging that the echo path model retained by the concerned quasi-static echo canceller 1*i* does not give an acceptable approximation of the characteristics of the actual echo path. Responsive to a modification request signal $req_i$, the selection unit 50 selects an idle self-adaptive echo canceller, such as 2*j*, and establishes a connection therethrough between the modification requesting quasi-static echo canceller 1*i* and the selected self-adaptive echo canceller 2*j*. In FIG. 4, it will be understood that the residual echo signal $e_{aj}$ illustrated with reference to FIG. 2 is sent to the selection unit 50 through a connection 6*j*2. This is because it is assumed with respect to the third embodiment that the echo path model rewriting means, such as comprising the echo path model comparing circuit 44 and the switch circuit 45 depicted in FIG. 2, are installed in the selection unit 50. In correspondence to the speech signal detector mentioned in conjunction with the first embodiment, it is possible to consider the monitors 6*l* through 6*n* as the circuit elements of the selection unit 50.

It is now understood that the channel to which one of the self-adaptive echo cancellers is to be coupled is selected in the case of the third embodiment only when the monitor, such as 6*i*, of one of the channels has judged that the quasi-static echo canceller of the channel is not duly functioning. This reduces the chance of reserving the self-adaptive echo cancellers and consequently make it possible to do with a very small number of such echo cancellers. It addition, it should be pointed out that the modification request signal has a tendency of being soon cancelled during utterance of substantially periodic speech sounds, such as vowels. More particularly, it is the general requisite for an echo canceller that the signal applied to the receive-in terminal of the echo canceller should have frequency components covering the whole range of the actual echo path of the frequency axis. On the other hand, most of the signals used during normal communication are those for voices although there frequently occur the pauses in a speech as described above. The voice may broadly be classified into substantially periodic speech sounds and aperiodic or less periodic speech sounds. Typical less periodic speech sounds are voiceless fricative consonants in the case of a self-adaptive echo canceller. For the substantially periodic speech sounds, a relatively small number of frequency components appear and last without excessive variation in the amplitudes. The less periodic speech sounds have frequency components of wide ranges. This shows that the signals representative of the substantially periodic speech sounds contribute relatively little to formation or modification of the echo path model. In other words, it is possible with only substantially periodic speech sound to form or decide an echo path model with reference to frequencies of a relatively narrow range. This makes it possible to decide the model within a short period of time. The residual echo signal therefore tends to rapidly decrease. Typical consonants have frequency distribution similar to the white noise. The performance of the echo path model is much raised by the signals representative of less periodic speech sounds. The wide range of the signal frequencies, however, requires a considerably long period of time to modify the model. It has now been found the ERLE, namely, the ratio of the level of the send-in signal to the level of the residual echo signal, is representative of the performance of the echo path model if the receive-in signals are those for the less periodic speech sounds. For the receive-in signals representative of the substantially periodic speech sounds, the ERLE rapidly grows large in most cases even though the echo path model may not yet give an excellent approximation of the characteristics of the actual echo path at the outside of the frequencies of the substantially periodic speech sound signals.

Turning back to FIG. 4, let it be assumed that the quasi-static echo canceller 1*i* is connected with the self-adaptive echo canceller 2*j* as a result of the modification request signal $req_i$. While the receive-in signal $x_i$ is substantially periodic, the self-adaptive echo canceller 2*j* rapidly adapts itself to the actual echo path to reduce its residual echo signal $e_{aj}$. The quasi-static echo canceller 1*i* is modified in compliance with the self-adaptive echo canceller 2*j* to reduces its residual echo signal $e_{si}$. The ERLE therefore rapidly grows large to cancel the modification request signal $req_i$ and to release the self-adaptive echo canceller 2*j*. As noted, the echo path model of the self-adaptive echo canceller 2*j* may not yet give a sufficient approximation of the characteristics of the actual echo path. The improvement of the self-adaptive echo path model, however, is not much expected so long as the substantially periodic signal is continually sent to the receive-in terminal 1*i*1. When the receive-in signal $x_i$ is less periodic, the self-adaptive echo canceller 2*j* sufficiently adapts itself to the characteristics of the actual echo path although it may take a considerable time to sufficiently reduce its residual echo signal $e_{aj}$. The echo path model of the quasi-static echo canceller 1i is now well adjusted to the actual echo path when the self-adaptive echo canceller 2*j* is released. If the less periodic signal ends before the self-adaptive echo canceller 2*j* is well adapted to the actual echo path, it may either be that the substantially periodic signal follows or that the talk has come to an end. In the former event, the seizure and the release of the self-adaptive echo canceller, such as 2*j*, may repeatedly progress. In this manner, adaptation of the quasi-static echo cancellers 1*l* through 2*n* to the respective actual echo paths is carried out according to the third embodiment primarily while the receive-in signals are less periodic. Together with the fact that there are many pauses in an actual conversation, the third embodiment makes it possible to unexpectedly reduce the number of complicated self-adaptive echo cancellers. The non-logic echo path rewriting means insures more effective operation of the third embodiment.

Figure 6:
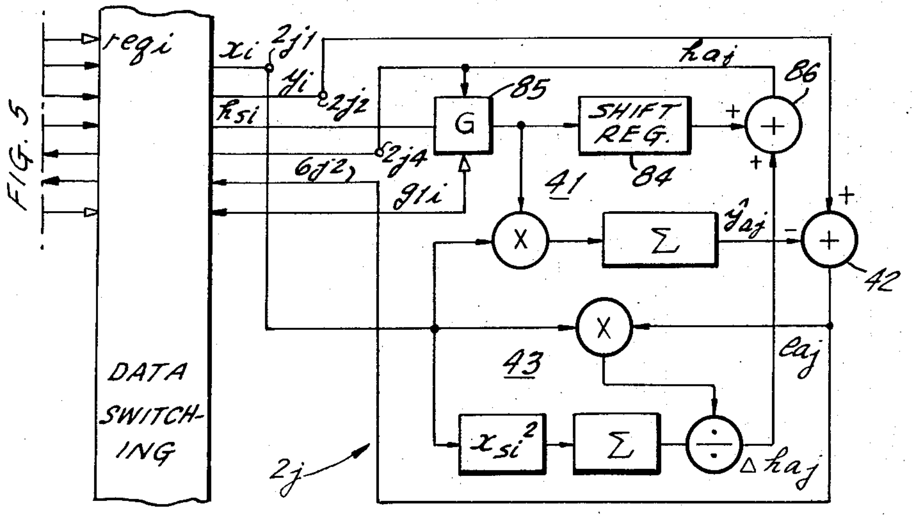
FIG. 6 is a block diagram of a self-adaptive echo canceller and an accompanying circuit used in the third embodiment of this invention.

Referring to FIGS. 5 and 6, examples of the quasi-static echo canceller 1*i* and the self-adaptive echo canceller 2*j* are reproduced from FIG. 3 of the referenced application for convenience of further description of the third embodiment. FIGS. 5 and 6 also show a comparator 7*i* including the monitor 6i mentioned above and a data switching device 8 of the echo canceller selection unit. The receive-in signal *xi* is supplied to the comparator 7*i* and to a signal shift register 8I through a signal gate 82. A predetermined number of receive-in signals samples $x_{si}$ are retained in the register 81 and circulated therethrough when the gate 82 is disabled against the receive-in signal $x_i$. Let it now be assumed that the self-adaptive echo canceller 2*j* is connected with the quasi-static echo canceller 1*i* through the data switching device 8. When the connection is established, the comparator 7*i* to which the residual echo signal $e_{si}$ is always applied is supplied further with the residual echo signal $e_{aj}$ of the self-adaptive echo canceller 2*j* through the connection 6*j*2 as described in conjunction with FIG. 4. Responsive to these signals $e_{si}$ and $e_{aj}$, the comparator 7*i* produces a self-adaptive gate enabling signal $g_{1i}$ when it judges that the echo path model retained by the self-adaptive echo canceller 2*j* be rewritten with reference to that retained by the quasi-static echo canceller 1*i* as is very often the case immediately after the establishment of the connection. With the examples shown, the echo path model is retained in a quasi-static model register 83 as quasi-static model elements $h_{si}$ and in a self-adaptive model register 84 as self-adaptive model elements $h_{aj}$. The gate enabling signal $g_{1i}$ enables a self-adaptive model gate 85 to substitute the quasi-static model elements $h_{si}$ for the content of the self-adaptive model register 84. Responsive to the receive-in signal samples $x_{si}$ and its own residual echo signal $e_{aj}$, the adaptive control unit 43 illustrated with reference to FIG. 2 successively produces model modifying signal elements $\Delta h_{aj}$, which are added to the corresponding model elements $h_{aj}$ at an adder 86 to adapt the elements $h_{aj}$ more closely to the characteristics of the actual echo path. When the self-adaptive echo signal $e_{aj}$ decreases as compared with the quasi-static residual echo signal $e_{si}$, the gate enabling signal $g_{1i}$ disappears to disable the gate 85 against the quasi-static model elements $h_{si}$. Thereupon, the self-adaptive model elements $h_{aj}$ are circulated through the register 84 while being further adapted to the actual echo path by the adaptive control unit 43. As soon as the self-adaptive residual echo signal $e_{aj}$ becomes appreciably less than the quasi-static residual echo signal $e_{si}$, the comparator 7*i* delivers a quasi-static gate enabling signal $g_{2i}$ to a quasi-static model gate 87 to enable the same for the self-adaptive model elements $h_{aj}$ supplied thereto through the echo path model transfer terminal 1*i*6. Element by element, the self-adaptive model elements $h_{aj}$ are now substituted for the previous quasi-static model elements $h_{si}$. Accordingly, the quasi-static residual echo signal $e_{si}$ decreases to make the comparator 7*i* cancel the modification request signal $req_i$, which in turn makes the switching device disconnect the self-adaptive echo canceller 2*j* from the quasi-static echo canceller 1*i*.

Figure 7:
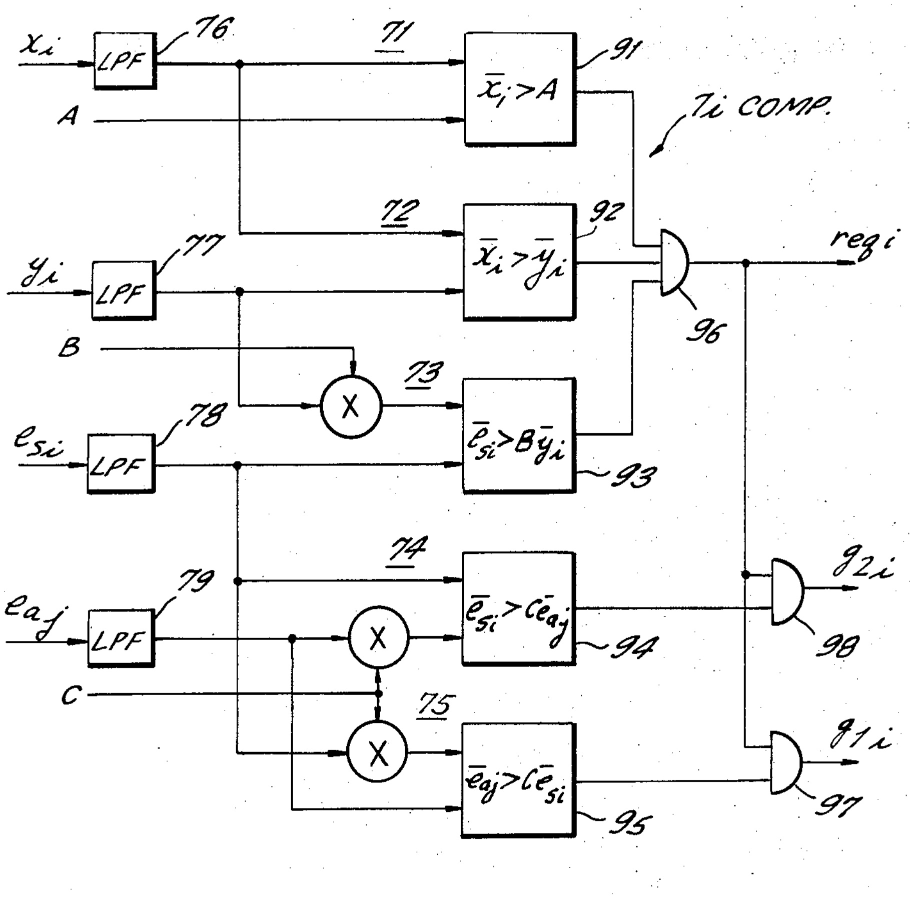
FIG. 7 is a block diagram of a comparator illustrated in FIG. 5.

Referring to FIG. 7, the comparator 7*i* comprises a receive-in signal monitor 71, a speech signal detector 72 for the local subscriber, an ERLE monitor 73 which corresponds to the monitor 6*i* illustrated in FIG. 4, a quasi-static model rewriting monitor 74, a self-adaptive model rewriting monitor 75. More particularly, the comparator 7*i* comprises short-time average circuits (which may be low-pass filters) 76, 77, 78, and 79 for deriving short-time averages $\bar{x}_i$, $\bar{y}_i$, $\bar{e}_{si}$, and $\bar{e}_{aj}$ of the receive-in signal $x_i$, the send-in signal $y_i$, the quasi-stationary residual echo signal $e_{si}$, and the self-adaptive residual echo signal $e_{aj}$, respectively. The receive-in signal monitor 71 comprises a comparator 91 for producing a logic "1" signal when the short-time average receive-in signal $\bar{x}_i$ is greater than a predetermined threshold level A, namely, when the speech signal is obviously sent to the junction between the four-wire line and the two-wire line from the remote subscriber. The speech signal detector 72 comprises a comparator 92 for producing a logic "1" signal when the average receive-in signal $\bar{x}_j$ is greater than the average send-in signal $\bar{y}_i$, namely, when the double talk is not present. The ERLE monitor 73 exemplified in FIG. 7 comprises a comparator 93 for producing a logic "1" signal when the average self-adaptive residual echo signal $\bar{e}_{si}$ is greater than the average send-in signal $\bar{y}_i$ by a factor B which is predetermined between zero and unity. The quasi-static model rewriting monitor 74 comprises a comparator 94 for producing a logic "1" signal when the average quasi-static residual echo signal $\bar{e}_{si}$ is greater than the average self-adaptive residual echo signal $\bar{e}_{aj}$ multiplied by a factor C predetermined between one and two. Quite similarly, the self-adaptive model rewriting monitor 75 comprises a comparator 95 for producing a logic "1" signal when the average self-adaptive residual echo signal $\bar{e}_{aj}$ is greater than the average quasi-static residual echo signal $\bar{e}_{si}$ multiplied by the last-mentioned predetermined factor C. Even though a logic "1" signal may be produced from the ERLE monitor 73, the modification request signal $req_i$ is useless either if there is no substantial speech signal sent to the receive-in terminal 1*i*1 from the remote subscriber of if that double talk is present. Accordingly, the comparator 7*i* comprises a first AND gate 96 for producing the modification request signal $req_i$ only when the modification of the quasi-static echo path model is indispensable and feasible. Likewise, the comparator 7*i* comprises a second AND gate 97 for producing the self-adaptive gate enabling signal $g_{1i}$ when the request signal $req_i$ is present and, in addition, when the self-adaptive echo path model should be rewritten with reference to the quasi-static echo path model. The comparator 7*i* also comprises a third AND gate 98 which similarly operates to produce the quasi-static gate enabling signal $g_{2i}$. Alternatively, the comparators 91 through 95 may produce either logic "0" signals under the circumstances specified above or any combination of logic signals. It will now be understood that the quasi-static model rewriting comparator 94 and the quasi-static model gate 87 correspond to the echo model comparing circuit 44 and the switch circuit 45 illustrated with reference to FIG. 2.

Figure 8:
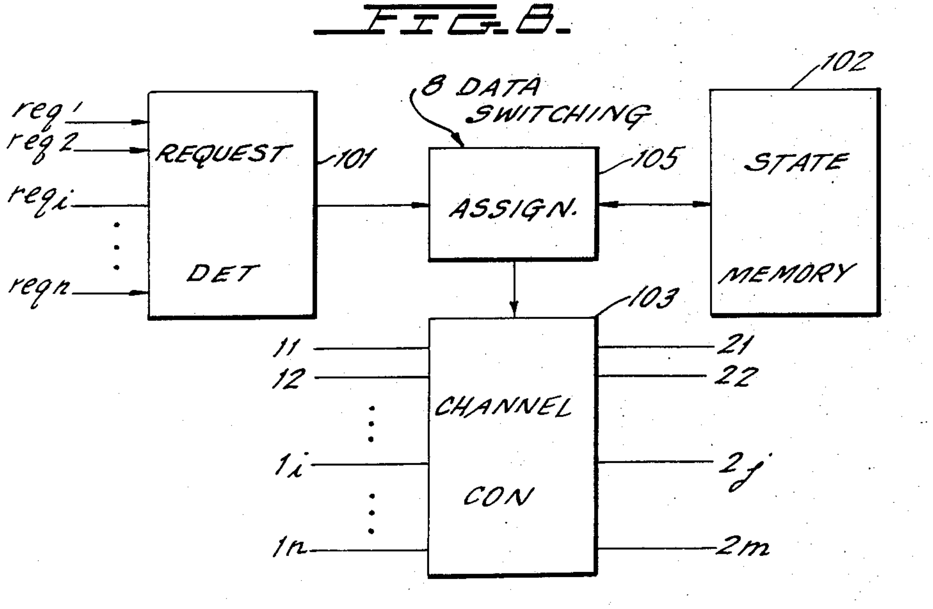
FIG. 8 is a block diagram of a data switching device used in the echo canceller selection unit depicted in FIG. 6.

Referring finally to FIG. 8, an example of the data switching device 8 comprises a request signal detector 101 for scanning the modification request signals $req_1$ through $req_n$, thereby identifying the modification requesting one or ones of the quasi-static echo cancellers 1*l* through 1*n*. The example further comprises a state memory 102 for memorizing the current states of the respective self-adaptive echo cancellers 2*l* through 2*m*, a channel connector 103 for establishing connections between selected pair or pairs of the quasi-static echo cancellers 1*l* through 1*n* and self-adaptive echo cancellers 21 through 2*m* in the manner known as the main link or register-sender link in the switching network art, and an assigning circuit 105 responsive to the detected modification request signal and the state (idle) of the self-adaptive echo cancellers for setting the channel connector 103 into operation in the manner known as the common control equipment also in the switching network art. The assiging circuit 103 notifies the state memory 102 of the selected or released self-adaptive echo cancellers or cancleers to update the memory

What is claimed is:

1. An echo canceller arrangement comprising:

a self-adaptive echo canceller;

a plurality of quasi-static echo cancellers each operatively associated with an equal plurality of channels, each channel having an echo path, each of said quasi-static echo cancellers having means for storing a first echo path model giving an approximation of the characteristics of the echo path of the associated channel, first means for selecting one of said channels and for operatively coupling said self-adaptive echo canceller with the quasi-static echo canceller associated with the selected channel, said self-adaptive echo canceller having means for storing a second echo path model giving an approximation of the characteristics of the echo path of said selected channel and further comprising means for self-adaptively improving the approximation stored in said second echo path model storing means with reference to the last-mentioned characteristics, and second means for comparing the residual echo signal approximations developed as a result of the echo path models stored in said self-adaptive echo canceller and said quasi-static echo canceller associated with said selected channel and for placing the echo path model in said self-adaptive echo canceller storing means into said quasi-static echo canceller storing means only when the residual echo signal developed by said self-adaptive echo canceller is smaller than the residual echo signal developed by said quasi-static echo canceller.

2. An echo canceller arrangement as claimed in claim 1, wherein said one of the echo path models is one of the first echo path models and said other of said echo path models is said second echo path model.

3. An echo canceller arrangement as claimed in claim 1, wherein said second means comprises non-logic means responsive to the coupling effected by said first means between one of said quasi-static echo cancellers and said self-adaptive echo canceller for substituting said second echo path model for said first echo path model retained by said one of said quasi-static echo cancellers.

4. An echo canceller arrangement as claimed in claim 1, wherein said second means comprises logic means responsive to the coupling effected by said first means between one of said quasi-static echo cancellers and said self-adaptive echo canceller and responsive to the echo path models retained by said one quasi-static echo canceller and by said self-adaptive echo canceller for replacing the first echo path model retained by said one quasi-static echo canceller with said second echo path model only when said second echo path model generates a smaller residual echo signal for the concerned actual echo path than said first echo path model.

5. An echo canceller arrangement as claimed in claim 1, wherein said first means comprises means for detecting presence and absence of double talk in each of said channels and means for selecting the channel in which absence of the double talk is detected.

6. An echo canceller arrangement as claimed in claim 1, said echo paths producing send-in signals, asid quasi-static echo cancellers producing residual echo signals, wherein said first means comprises monitoring means for monitoring the ratio of the level of the send-in signal in each of said channels to the level of the residual echo signal in said each channel to produce a modification request signal when said ratio is less than a predetermined threshold value and means for selecting the channel for which the modification request signal is produced.

7. An echo canceller arrangement as claimed in claim 6, wherein said monitoring means comprises comparator means responsive to a first short-time average of said send-in signal and a second short-time average of said residual echo signal of said each channel for producing said modification request signal when said first short-time average is greater than said second short-time average by a factor equal to the reciprocal of said ratio.

* * * * *